United States Patent Office 3,119,709

Patented Jan. 28, 1964

3,119,709

MATERIAL AND METHOD FOR ELECTROLESS DEPOSITION OF METAL

Ralph B. Atkinson, Los Angeles, Calif., assignor to Atkinson Laboratory, Inc., Los Angeles, Calif., a corporation of California No Drawing. Filed Sept. 28, 1956, Ser. No. 612,581
9 Claims. (Cl. 117—47)

This invention relates generally to the coating of non-metallic objects, such as objects made of glass, plastic, etc., with a metal, and more particularly to the coating of such objects with an electrically conducting film or layer of a metal having low electrical resistance.

In the electrical and electronic industries, non-conductors, or insulators, are frequently used as supports for conducting members. In many cases, the conductor may take the form of a foil or heavier member that is anchored to the insulator by suitable means, such as rivets, adhesives, etc. However, in many other instances, this is not a practical method.

For example, frequent use is made of boards or sheets of an insulator, such as a phenolic resin, having conductors formed on the surface by means of a conducting foil that is etched or otherwise removed in various places to leave conducting strips. Various electrical components, such as capacitors, inductors, etc., are mounted on the boards, and connection must be made between the conducting leads and the various components. Since the components are usually riveted or otherwise similarly attached to the board, it is most convenient to make connection between the component and the conductor by means of a member inserted through a hole in the board and suitably anchored thereto. Various methods have been tried, such as the use of hollow rivets, etc., but these methods have not proven completely satisfactory because of the time and expense involved, the difficulty of securing good electrical connections, and similar defects.

Attempts have been made to solve the problem by coating the wall of the hole with a conducting material, as by applying a metallic paint, a suspension of graphite, etc. Other attempts have been directed to the coating of the wall with a silver deposit, such as is produced in the manufacture of mirrors. The conducting paints and suspensions have the disadvantage that in their final form, these processes do not provide good conductors, while the use of the silver deposit is expensive and the solutions required do not keep well.

Copper is a good electrical conductor, and has the further advantage of being comparatively cheap. Methods of reducing copper from solution to the metallic state are well known, but heretofore there has been no satisfactory method for doing this and obtaining a continuous conducting film having good adhesion to a non-metallic surface. Other materials having good electrical conductivity have been deposited on such non-metallic surfaces, but most of these metals are in the noble metal group, such as platinum and gold, and in addition to being expensive, the processes have usually required considerable heating of the solution and the material placed in it, which can render the process impractical for objects made of certain thermoplastic materials.

While the deposition of metals by purely chemical action, as in the silvering of mirrors, known in the trade as electroless deposition of metals, presently finds its greatest application in the coating of non-conducting surfaces, it is to be understood that the process is equally applicable to the coating of conducting surfaces, such as metals, though generally electroplating is preferred for the latter application.

It is therefore a major object of this invention to provide an improved method for the electroless deposition of metals upon a surface.

Another object of the invention is to provide such a method that produces a continuous electrical conducting film having a low resistance.

It is a further object of this invention to provide such a method that is less expensive than prior methods, and can be performed at normal room temperature.

Still another object of the invention is to provide a method using materials that have good storage properties and do not deteriorate before use, and do not deteriorate rapidly when use has started.

It is a still further object of the invention to provide a process and the materials therefor, that is rapid and does not require special equipment, but can be used with conventional treating devices, and is particularly adapted for use in conjunction with automatic material handling equipment.

These, and other objects and advantages of the invention, will become apparent from the following description of a preferred method of practicing the invention, and of the materials used in connection therewith.

The deposition of silver on glass to form mirrors is a comparatively ancient process, and it has long been known that the adhesion of the silver to the glass can be greatly improved by first treating the surface of the glass with certain metallic salts, e.g., stannous chloride. Thereafter, when the surface of the glass is treated with the proper silver salt, the stannous chloride acts to insure that the reduction of the silver will take place on that same surface and that the resulting metal coating will adhere thereto. The mechanism of this reaction is not well understood, but in the production of mirrors, it appears that the tin ions are adsorbed by the glass from the aqueous solution, and when an aqueous solution containing silver and a reducing agent is subsequently applied to the glass, the adsorbed tin ions act as a series of nuclei for the seeding or deposition of silver atoms. Other metals besides silver react in substantially the same way, and consequently these other metals may be deposited upon a non-conductor in the same way that silver is.

Likewise, other compounds are known besides stannous chloride which act to insure the deposition and adhesion of silver or other metals in this manner, and these compounds include titanium oxide, stannic oxide, zirconium oxide, and thorium oxide. In each case, a solution having the pH necessary to dissolve the particular material is used to pretreat the surface to be coated prior to the application of the treatment bath containing the metal to be deposited.

In the deposition of copper, it has been known that the presence of a noble metal, e.g., platinum, acts to cause copper to be adheringly deposited on the non-conductor in much the same manner that stannous chloride causes the adhering deposit of silver on glass.

A second pretreating step therefore comprises securing the adhesion of the noble metal to the non-conductive support. The article to be coated is thus first pretreated with a stannous chloride or similar solution, after which the article is treated with a solution containing a noble metal salt. In brief, the present invention makes use of a first pretreatment bath of stannous chloride or similar compound, and also makes use of a second pretreatment bath as mentioned. Thereafter a third or treatment bath is used to provide the copper or other metal coating.

By way of examples, the following solutions have been found satisfactory.

Bath I—first pretreatment bath:

Example A—

| | | |
|---|---|---|
| Stannous chloride | gm | 5 |
| Hydrochloric acid 10 N | ml | 5 |
| Water to 1.0 liter. | | |

Example B—

| | | |
|---|---|---|
| Thorium nitrate | gm | 10 |
| Nitric acid 8 N | ml | 5 |
| Water to 1.0 liter. | | |

Bath II—second pretreatment bath:

Example C—

| | | |
|---|---|---|
| Platinum chloride | gm | 0.05 |
| Hydrochloric acid 10 N | ml | 1 |
| Water to 1.0 liter. | | |

Example D—

| | | |
|---|---|---|
| Palladium chloride | gm | 0.1 |
| Hydrochloric acid 10 N | ml | 1 |
| Water to 1.0 liter. | | |

Previous workers have suggested the use of pretreating solutions substantially the same as those given above, but so far as is known, no one has provided a final treatment step that will produce a deposition of copper that provides a uniform film of conducting metal on a non-metallic surface. Furthermore, treatment baths or solutions have not previously been known which, simultaneously containing a reducing agent such as formaldehyde or hydrazine, and reducible copper ions, will remain stable for any length of time. Instead, these baths or solutions tend to react spontaneously to deposit copper in crystalline form regardless of the presence of a specially treated surface. Consequently, prior solutions, after a relatively short period of time, will start to deposit copper crystals upon the walls of tanks or containers in which they are kept.

It has now been found that it is possible to produce a treating bath containing a reducing agent and copper ions, and to keep this bath stable over an extended period of time. This permissible keeping time can be measured in months, and at the end of that time the bath will readily and immediately deposit copper whenever a suitably treated surface is immersed in it. Upon immersion of the pretreated surface in the coating or treating bath, the useful life of the bath is considerably shortened, but it is still sufficiently long to permit it to be used successfully for a period of eight hours or so. The bath may still be effective at the end of this time, but in normal manufacturing procedures, it is usually considered advisable to replace the bath at the end of an 8 hour work shift.

These results have been accomplished by a suitable adjustment of the pH of the copper bath, together with a buffer material in a quantity sufficient to render the bath stable in use. Additionally a chelating agent is used which keeps the copper in solution, yet ready to be reduced whenever the suitably pretreated surface is present. A wetting agent aids considerably in the uniform functioning of such a bath over the entire surface, and with this bath a continuous electrically conducting film is produced.

It has also been found that other metallic ions, e.g., silver, gold and platinum ions, may be kept in a stable reducing solution and deposited on a pretreated surface in this same manner. By way of examples, the following illustrations are given.

Bath III:

Example E—

| | | |
|---|---|---|
| Cupric sulphate (crystalline) | gm | 10 |
| N,N,N′,N′ tetrakis (2-hydroxypropyl) ethylene diamine | gm | 10 |
| Wetting agent (Glim [1]) | gm | 15 |
| Sodium hydroxide | gm | 8 |
| Trisodium phosphate | gm | 15 |
| Formaldehyde (37%) | ml | 35 |
| Water to 1.0 liter. | | |

Example F—

| | | |
|---|---|---|
| Water | ml | 300 |
| Ethylene diamine tetra acetic acid (Versene [2]) | gm | 120 |
| Wetting agent (Udylite #22 [3]) | ml | 10 |
| Silver nitrate | gm | 20 |
| Aqua ammonia ($NH_4OH$), q.s. to give pH 11 to 12. | | |
| Sodium potassium tartrate | gm | 30 |

[1] Trademark of B. T. Babbitt, Inc. for its alkylphenyl polyglycol ether.
[2] Trademark of Dow Chemical Co.
[3] Trademark of Udylite Corp.

In Example E the cupric sulphate provides the necessary copper ions for deposition on the surface to be coated, N,N,N′,N′ tetrakis (2 hydroxypropyl) ethylene diamine (available under the trade name "Quadrol") is the chelating agent, sodium hydroxide provides the proper pH, while the trisodium phosphate is the buffer, and formaldehyde is the reducing agent.

This bath has been found to work very satisfactorily and produce a good deposit on materials that have previously been pretreated as discussed above. The pH of the bath is in the range of approximately 11 to 12.5.

In Example F, where silver is to be deposited, ethylene diamine tetra acetic acid is the chelating agent, silver nitrate supplies the metallic ions, ammonia provides the proper pH, and sodium potassium tartrate is the reducing agent.

It will be realized that each of the foregoing examples is subject to variations, and that different wetting agents may be used. In the description of the process given hereinafter, certain of these variations will be noted.

As previously mentioned, the practice of this invention in the deposition of copper requires the use of three separate baths, the entire process being carried out at normal room temperatures, and being accomplished very quickly. Assuming that the surface to be coated is that of a board formed of an epoxy resin, the surface is first cleaned as by a cold or a vapor degreaser. Alternatively, a mixture of #4F pumice with dilute acetic acid can be used, or a foaming wetting agent applied with a stiff brush may be used to clean the surface. Thereafter, the surface is rinsed in cold water, and the article to be coated is then immersed for two minutes in the following solution, at approximately 70° F.

Bath I:

| | | |
|---|---|---|
| Stannous chloride | gm | 4 |
| Hydrochloric acid | ml | 2 |
| Wetting agent (Udylite 22) | ml | 1 |
| Water to 1.0 liter. | | |

After a rinse in cold water, the article is immersed for two minutes in a second bath, likewise maintained at approximately 70° F.

| | | |
|---|---|---|
| Palladium chloride | gm | 0.1 |
| Hydrochloric acid | ml | 1 |
| Wetting agent (Udylite 22) | ml | 1 |
| Water to 1.0 liter. | | |

Treatment in the second bath is followed by a cold water rinse, and the article is then immersed for ten minutes in the following bath, likewise held at approximately 70° F. or lower:

| | | |
|---|---|---|
| Cupric sulphate | gm | 10 |
| N,N,N',N'tetrakis (2-hydroxypropyl) ethylene diamine | gm | 10 |
| Sodium hydroxide | gm | 8 |
| Trisodium phosphate | gm | 15 |
| Formaldehyde (37%) | ml | 35 |
| Wetting agent | | q.s. |
| Water to 1.0 liter. | | |

The article is then given a final rinse in cold water, and allowed to dry. The surfaces of the article will be found to be coated with a thin electrically conducting layer of copper. If the article is a board of epoxy resin, as previously suggested, through which holes have been formed and whose surfaces are clad with a thin coating of copper, the original copper will have additional copper deposited on it, and the walls of the holes will also be coated with copper, so that complete electrical continuity is provided in all cases.

While, as mentioned, previous attempts have been made to secure the electroless deposition of metals such as copper, these efforts have generally been subject to a number of objections. By the present method the cost of the various baths is kept to a minimum, stability of the baths is immeasurably increased, and the process may be carried on at ordinary room temperatures by conventional handling equipment. Furthermore, the coating produced by this method possesses good electrical conductivity, and forms a good connection with other metallic surfaces present.

From the foregoing, it will be seen that the pretreatment baths are for the purpose of providing a suitable coating to insure the deposition and adhesion of the later deposited metal. Thus the stannous chloride forms such a coating for silver in the manufacture of mirrors, and the palladium chloride forms a corresponding coating for copper in the illustrative example. Such a "precoat" is necessary for the proper deposition and adherence of the later deposited metal, whether this precoat is formed by one, two, three, or more, pretreatment operations, or is present on the surface to be treated without any pretreatment. The present invention is concerned primarily with the final treatment, wherein the desired metal is deposited, and important features of this treatment are the use of a chelating agent, and the maintenance of the treatment bath at a pH in approximately the range of 10 to 14 and preferably in the range of 11 to 12.5.

As indicated in the above description, the process is suitable for the deposition of metals besides copper, and furthermore, changes and modifications may be made in the various baths which will be apparent to those skilled in the art. Consequently, the invention is not to be limited to the particular materials set forth, except as limited by the following claims.

I claim:

1. The method of electroless deposition of copper upon a non-metallic surface pretreated to adheringly receive the deposited copper, which includes the step of applying to said non-metallic surface an aqueous solution containing a soluble copper salt, formaldehyde and ethylenediaminetetrascetic acid, said solution having a pH in the approximate range of 10–14.

2. The method of claim 1 wherein said non-metallic surface is pretreated to adheringly receive said deposited copper by the steps of: (1) applying to said non-metallic surface a solution containing a salt of one of the metals of the group consisting of tin, titanium, zirconium and thorium, that is adsorbed to said non-metallic surface; and (2) applying to said non-metallic surface a solution containing a salt of one of the metals of the group consisting of platinum and palladium.

3. The method of electroless deposition of copper upon a non-metallic surface pretreated to adheringly receive the deposited copper, which includes the step of applying to said non-metallic surface an equeous solution containing a soluble copper salt, formaldehyde, a chelating agent having the formula:

$$RR'—N—CH_2\cdot CH_2—N—R''R'''$$

where R, R', R'' and R''' are organic radicals each containing at least two carbon atoms and at least one hydroxy group, said solution having a pH in the approximate range of 10–14.

4. The method of claim 3 wherein said non-metallic surface is pretreated to adheringly receive said deposited copper by the steps of: (1) applying to said non-metallic surface a solution containing a salt of one of the metals of the group consisting of tin, titanium, zirconium and thorium, that is adsorbed to said non-metallic surface; and (2) applying to said non-metallic surface a solution containing a salt of one of the metals of the group consisting of platinum and palladium.

5. The method of electroless deposition of copper upon a non-metallic surface pretreated to adheringly receive the deposited copper, which includes the step of applying to said non-metallic surface an aqueous solution containing a soluble copper salt, a reducing agent, a chelating agent having the formula:

$$RR'—N—CH_2\cdot CH_2—N—R''R'''$$

where R, R', R'' and R''' are organic radicals each containing at least two carbon atoms and at least one hydroxy group, said solution having a pH in the approximate range of 10 to 14.

6. The method of claim 5 wherein said non-metallic surface is pretreated to adheringly receive said deposited copper by the steps of: (1) applying to said non-metallic surface a solution containing a salt of one of the metals of the group consisting of tin, titanium, zirconium and thorium, that is adsorbed to said non-metallic surface; and (2) applying to said non-metallic surface a solution containing a salt of one of the metals of the group consisting a platinum and palladium.

7. The method of electroless deposition of copper upon a non-metallic surface pretreated to adheringly receive the deposited copper, which includes the step of applying to said non-metallic surface an aqueous solution containing a soluble copper salt, a reducing agent and ethylenediaminetetrascetic acid, said solution having a pH in the approximate range of 10 to 14.

8. The method of claim 7 wherein said non-metallic surface is pretreated to adheringly receive said deposited copper by the steps of: (1) applying to said non-metallic surface a solution containing a salt of one of the metals of the group consisting of tin, titanium, zirconium and thorium, that is adsorbed to said non-metallic surface; and (2) applying to said non-metallic surface a solution containing a salt of one of the metals of the group consisting of platinum and palladium.

9. The method of electroless deposition of copper upon a non-metallic surface pretreated to adheringly receive the deposited copper, which includes the step of applying to said non-metallic surface an aqueous solution containing a soluble copper salt, a reducing agent and a water-soluble salt of ethylenediaminetetrascetic acid, said solution having a pH in the approximate range of 10 to 14.

References Cited in the file of this patent

UNITED STATES PATENTS 2,430,581 Pessel ---------------- Nov. 11, 1947

(Other references on following page)

UNITED STATES PATENTS

| | | |
|---|---|---|
| 2,454,610 | Narcus | Nov. 23, 1948 |
| 2,602,757 | Kantrowitz | Apr. 9, 1948 |
| 2,702,253 | Bergstrom | Feb. 15, 1955 |
| 2,766,138 | Talmey | Oct. 9, 1956 |
| 2,772,183 | Talmey | Nov. 27, 1956 |
| 2,814,590 | Portzer | Nov. 26, 1957 |
| 2,871,139 | Wein | Jan. 27, 1959 |

| | | |
|---|---|---|
| 2,874,072 | Cahill | Sept. 17, 1959 |
| 2,879,175 | Umblia et al. | Mar. 24, 1959 |

FOREIGN PATENTS

| | | |
|---|---|---|
| 731,102 | Germany | Feb. 3, 1943 |

OTHER REFERENCES

Narcus, Metal Finishing, vol. 50, #30, March, 1952, pp. 54–62.